US009055284B2

(12) United States Patent
Nanri et al.

(10) Patent No.: US 9,055,284 B2
(45) Date of Patent: *Jun. 9, 2015

(54) STEREO IMAGE PROCESSING APPARATUS AND STEREO IMAGE PROCESSING METHOD

(75) Inventors: Takuya Nanri, Kanagawa (JP); Kensuke Maruya, Osaka (JP); Hisashi Kurokawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 208 days.

This patent is subject to a terminal disclaimer.

(21) Appl. No.: 13/818,473

(22) PCT Filed: Dec. 19, 2011

(86) PCT No.: PCT/JP2011/007084
§ 371 (c)(1),
(2), (4) Date: Feb. 22, 2013

(87) PCT Pub. No.: WO2012/086173
PCT Pub. Date: Jun. 28, 2012

(65) Prior Publication Data
US 2013/0147922 A1      Jun. 13, 2013

(30) Foreign Application Priority Data

Dec. 20, 2010 (JP) .................................. 2010-283622

(51) Int. Cl.
*H04N 13/02* (2006.01)
*G01C 11/06* (2006.01)
*G06T 7/00* (2006.01)

(52) U.S. Cl.
CPC ............ *H04N 13/0203* (2013.01); *G01C 11/06* (2013.01); *G06T 7/0022* (2013.01); *G06T 2207/10012* (2013.01); *G06T 7/0075* (2013.01); *G06T 2207/20021* (2013.01)

(58) Field of Classification Search
CPC ................... G01C 11/06; G06T 2207/10012; G06T 2207/20021; G06T 7/0022; G06T 7/0075; H04N 13/0203
See application file for complete search history.

(56) References Cited

U.S. PATENT DOCUMENTS 5,684,890 A *  11/1997  Miyashita et al. ............ 382/154
8,184,200 B1 *   5/2012  Biswas et al. ................. 348/459

(Continued)

FOREIGN PATENT DOCUMENTS

| JP | 2008-123141 A | 5/2008 |
| WO | 2009/096520 A1 | 8/2009 |
| WO | 2010/113389 A1 | 10/2010 |

OTHER PUBLICATIONS

International Search Report for PCT/JP2011/007084 dated Feb. 14, 2012.

*Primary Examiner* — Sath V Perungavoor
*Assistant Examiner* — Peter D Le
(74) *Attorney, Agent, or Firm* — Pearne & Gordon LLP

(57) ABSTRACT

Provided is a stereo image processing apparatus wherein parallax can be calculated with high precision. A window-function shifting unit (411) sets a third window function, which is formed by shifting a second window function on the basis of the amount of deviation in sub-pixel units, onto an image cutting-out unit (412). The image cutting-out unit (412) applies the second window function to a position subjected to a cut-out, cuts out a unit partial target image from a standard image, applies the second window function or the third window function, and cuts out a unit partial reference image from a reference image. A peak-position detection unit (106) calculates the amount of deviation in sub-pixel units on the basis of the phase difference between a data string comprising brightness of the cut-out unit partial target image, and a data string comprising brightness of the cut-out unit partial reference image.

4 Claims, 12 Drawing Sheets

(56) References Cited

U.S. PATENT DOCUMENTS

| | | |
|---|---|---|
| 2002/0012459 A1* | 1/2002 | Oh .............................. 382/154 |
| 2009/0207235 A1* | 8/2009 | Francini et al. ............... 348/46 |
| 2009/0304266 A1 | 12/2009 | Aoki et al. |
| 2012/0026165 A1* | 2/2012 | Morifuji ....................... 345/419 |
| 2012/0026295 A1 | 2/2012 | Nishimura et al. |

* cited by examiner $$SAD(n) = \sum_{j=ya-wv/2}^{ya+wv/2} \sum_{i=xa-wh/2}^{xa+wh/2} |f(x+i, y+j) - g(x+i+n, y+j)|$$

$$f'(m) = f(xa+m, ya) \times \frac{1}{2}\left\{\cos(\pi \frac{m}{K-J})+1\right\}$$

$$g'(m) = g(xa+n+m, ya) \times \frac{1}{2}\left\{\cos(\pi \frac{m}{K-J})+1\right\}$$

WHERE, $0 \leq m \leq K-J$ $$z(m) = \sum_{k=J}^{K} f'(-k) \times g'(m-k)$$

$$f'(m) = f(xa+m, ya) \times \frac{1}{2}\left\{\cos(\pi \frac{m}{K-J})+1\right\}$$

$$g'(m) = g(xa+n+m, ya) \times \frac{1}{2}\left\{\cos(\pi \frac{m-\Delta d}{K-J})+1\right\}$$

WHERE, $0 \leq m \leq K-J$ $$z(m) = \sum_{k=J}^{K} f'(-k) \times g'(m-k)$$

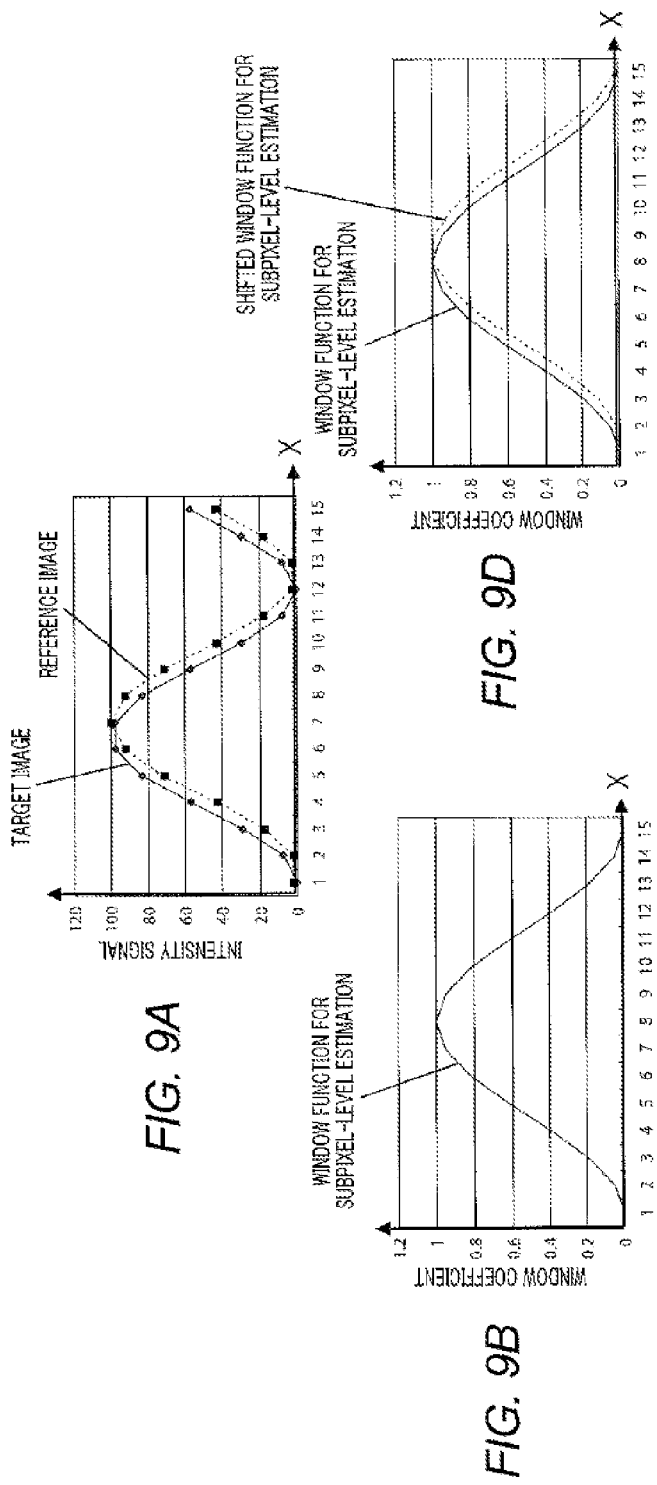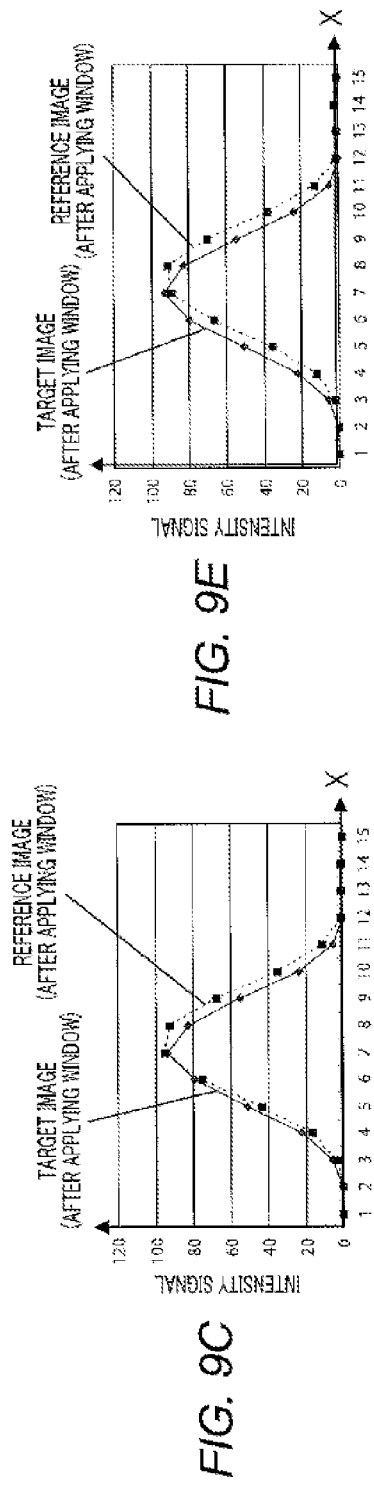
FIG. 9A
FIG. 9B
FIG. 9C
FIG. 9D
FIG. 9E

STEREO IMAGE PROCESSING APPARATUS AND STEREO IMAGE PROCESSING METHOD

TECHNICAL FIELD

The claimed invention relates to a stereo image processing apparatus and a stereo image processing method that compute, based on stereo images (a target image and a reference image) capturing the same object, the disparity between the images caused by parallax.

BACKGROUND ART

There are conventionally known stereo image processing apparatuses that compute, based on two images (a target image and a reference image) of the same object as captured by a stereo camera, the disparity between those images, and that measure the distance to the object based on the computed disparity between the images. Applications considered for these stereo image processing apparatuses include, for example, an apparatus that measures the distance to a vehicle or pedestrian ahead based on stereo images of the vehicle or pedestrian taken by a vehicle-mounted camera. However, due to the reduction in the sizes of cameras (e.g., vehicle-mounted cameras) in recent years, camera separations are also becoming smaller, as a result of which disparities between stereo images are also becoming smaller. Accordingly, accurate disparity computation functionality is beginning to be demanded of stereo image processing apparatuses.

As an accurate stereo matching (disparity computation in stereo image processing) scheme for stereo image processing apparatuses, a one-dimensional phase only correlation (POC) scheme has been proposed, for example (see Patent Literature 1, for example). In this one-dimensional POC scheme, a partial image (a one-dimensional image data sequence) is first extracted from each of a target image and a reference image using the Hanning window. Next, the extracted partial target image and partial reference image undergo a one-dimensional Fourier transform to be turned into Fourier image data, and are subsequently combined. The amplitude components of the combined Fourier image data are normalized, after which a one-dimensional inverse Fourier transform is performed. A phase-only correlation coefficients are thus derived. The disparity between the images (parallax) is then computed based on the correlation peak of the phase-only correlation coefficients.

CITATION LIST

Patent Literature

PTL 1
Japanese Patent Application Laid-Open No. 2008-123141

SUMMARY OF INVENTION

Technical Problem

However, the related art above has a problem in that it is difficult to accurately compute parallax for objects that occupy a small image region size in stereo images in the base line length direction (hereinafter referred to as the "image region size in the base line length direction"), examples of which include pedestrians located afar, and so forth. This is because, although, when the image region size in the base line length direction is small, the one-dimensional image data sequence needs to be made small in order to reduce the influence of the image of the background/surroundings, the accuracy of the correlation peak mentioned above decreases as the one-dimensional image data sequence becomes smaller.

The claimed invention is made in view of the point above, and an object thereof is to provide a stereo image processing apparatus and a stereo image processing method that enable accurate disparity computation even for objects of small image region sizes in the base line length direction.

Solution to Problem

A stereo image processing apparatus according to an embodiment of the claimed invention is a stereo image processing apparatus that computes a subpixel-level disparity between a target image and a reference image that form stereo images, the stereo image processing apparatus including: an extraction section that extracts a unit partial target image for subpixel estimation from the target image by applying a first window function at an extraction target position, and that extracts a unit partial reference image for subpixel estimation from the reference image by applying the first window function or a second window function that is set; a computation section that computes the subpixel-level disparity based on a phase difference between a data sequence including intensity values of the extracted unit partial target image for subpixel estimation and a data sequence including intensity values of the extracted unit partial reference image for subpixel estimation; and a window function setting section that sets, with respect to the extraction section, the second window function, which is formed by shifting the first window function based on the subpixel-level disparity computed by the computation section.

A stereo image processing method according to an embodiment of the claimed invention is a stereo image processing method that computes a subpixel-level disparity between a target image and a reference image that form stereo images, the stereo image processing method including: an extraction step of extracting a unit partial target image for subpixel estimation from the target image by applying a first window function at an extraction target position, and extracting a unit partial reference image for subpixel estimation from the reference image by applying the first window function or a second window function that is set; a computation step of computing the subpixel-level disparity based on a phase difference between a data sequence including intensity values of the extracted unit partial target image for subpixel estimation, and a data sequence including intensity values of the extracted unit partial reference image for subpixel estimation; and a window function setting step of forming and setting the second window function by shifting the first window function based on the subpixel-level disparity computed through the computation step.

Advantageous Effects of Invention

With the claimed invention, it is possible to provide a stereo image processing apparatus and a stereo image processing method that enable accurate parallax computation even for objects of small image region sizes in the base line length direction.

BRIEF DESCRIPTION OF DRAWINGS

FIGS. 9A through 9E are charts illustrating the concept of a process by a window shift section;

DESCRIPTION OF EMBODIMENTS

Figure 1:
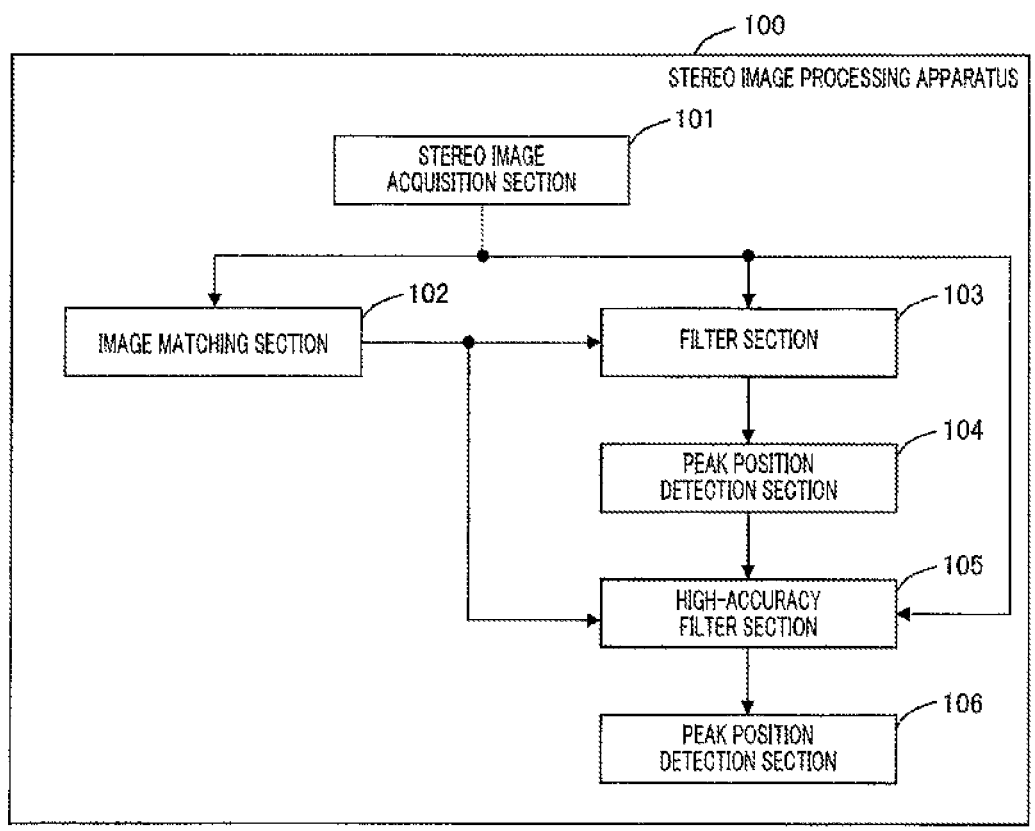
FIG. 1 is a block diagram showing the configuration of a stereo image processing apparatus according to Embodiment 1 of the claimed invention.

Embodiments of the claimed invention are described in detail below with reference to the drawings. With regard to the embodiments, like elements are designated with like reference numerals, while descriptions thereof are omitted to avoid redundancy. In the descriptions below, it is assumed that the X-axis lies in the horizontal direction of the image, that the Y-axis lies in the vertical direction of the image, and that one pixel represents one coordinate point.

[Embodiment 1]

[Configuration of Stereo Image Processing Apparatus 100]

FIG. 1 shows a configuration of stereo image processing apparatus 100 according to Embodiment 1 of the claimed invention. With respect to FIG. 1, stereo image processing apparatus 100 includes stereo image acquisition section 101, image matching section 102, filter section 103, peak position detection sections 104 and 106, and high-accuracy filter section 105.

Stereo image acquisition section 101 acquires stereo images taken with two or more imaging systems (i.e., cameras). The stereo images include a target image and a reference image of the same object taken by two distinct imaging systems. Stereo image acquisition section 101 then outputs the acquired stereo images to image matching section 102, filter section 103, and high-accuracy filter section 105. For the present embodiment, it is assumed that stereo image acquisition section 101 acquires stereo images taken by two cameras whose base line length direction generally coincides with the horizontal direction.

Image matching section 102 acquires, on a pixel level, a point in the reference image corresponding to a target point in the target image. Specifically, image matching section 102 acquires, on a pixel level, a point the reference image corresponding to a target point in the target image by performing an image matching process on the target image and reference image acquired at stereo image acquisition section 101. Image matching section 102 then computes "pixel-level disparity n" between the target image and the reference image. On the other hand, the "parallax" between the target image and the reference image obtained by peak position detection section 104 and peak position detection 106, which are discussed hereinafter, is given in subpixels. In other words, the disparity between the target image and the reference image is roughly detected in "pixels" at image matching section 102, and, thereafter, the disparity between the target image and the reference image is finely detected in "subpixels" by peak position detection section 104 and peak position detection section 106.

Specifically, image matching section 102 takes one predetermined pixel included in the target image to be a "target point," and extracts from the target image a partial image of the surroundings centered around the target point (hereinafter referred to as a "unit partial target image"). Image matching section 102 also extracts from the reference image a plurality of partial images of the same size as the unit partial target image (hereinafter referred to as "unit partial reference images"). The plurality of unit partial reference images are extracted from the reference image at different positions. In extracting the unit partial target image and the unit partial reference images, a rectangular window of a predetermined size (vertical size: wv pixels, horizontal size: wh pixels) may be used, for example. The window function that defines this rectangular window will be referred to below as a "window function for pixel-level estimation."

In the case of stereo cameras, parallax between the target image and the reference image only occurs in the base line length direction of the camera. Accordingly, image matching section 102 may extract the plurality of unit partial reference images by varying the extraction position along the base tine length direction. Furthermore, the disparity between the position of the target point in the target image and the position of the corresponding point in the reference image is computed as pixel-level disparity n mentioned above.

Image matching section 102 identifies, from among the plurality of extracted unit partial reference images, the unit partial reference image with the greatest level of match with respect to the unit partial target image. The one pixel in the thus identified unit partial reference image corresponding to the "target point" is the "pixel-level corresponding point" in the reference image. As a measure of the level of match, a sum of absolute differences (SAD) value, which signifies intensity difference, may be used, for example.

Filter section 103 takes, as input, the target point and disparity n from image matching section 102, as well as the stereo images from stereo image acquisition section 101. Filter section 103 then computes an inverted phase filter coefficient based on the target image and the position of the target point. Filter section 103 then performs a filtering process around the pixel-level corresponding point in the reference image using the thus computed inverted phase filter coefficient.

Figure 2:
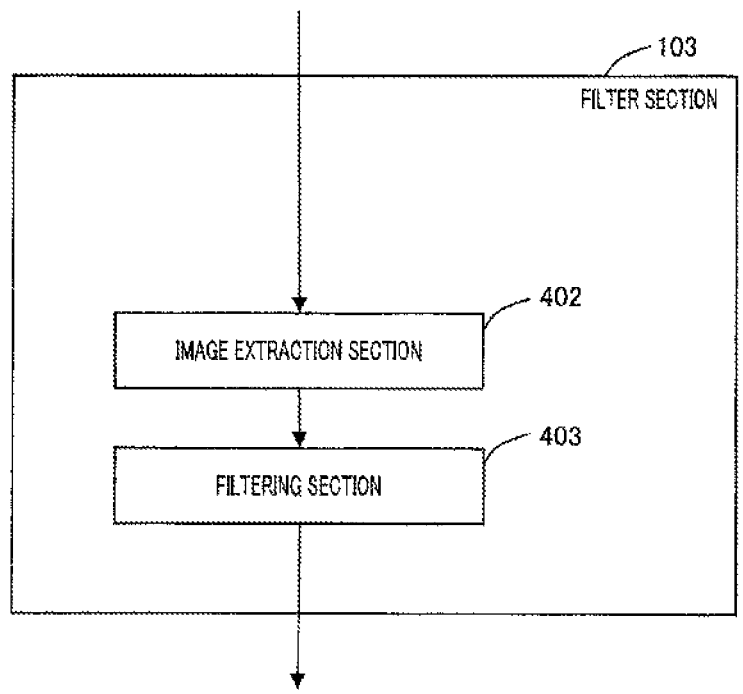
FIG. 2 is a block diagram showing the configuration of a filter section.

FIG. 2 shows a configuration of filter section 103. With respect to FIG. 2, filter section 103 includes image extraction section 402 and filtering section 403.

Image extraction section 402 extracts, as a unit partial target image for subpixel estimation, a partial image from the target image in the base line length direction of the stereo images. A window function for subpixel-level estimation is used for the extraction of the unit partial target image for subpixel estimation. The Hanning window function may be used for the window function for subpixel-level estimation, for example. Furthermore, image extraction section 402 uses the window function for subpixel-level estimation to extract, from the reference image and as a unit partial reference image for subpixel estimation, a partial image of the same size as the unit partial target image for subpixel estimation.

Image extraction section 402 then outputs to filtering section 403 the unit partial target image for subpixel estimation and the unit partial reference image for subpixel estimation.

For the present embodiment, it is assumed that image extraction section 402 determines the image extraction position in the target image in such a manner that the target point would be included in the unit partial target image for subpixel estimation. Furthermore, it is assumed that image extraction section 402 determines the image extraction position in such a manner that the pixel-level corresponding point would be included in the unit partial reference image for subpixel estimation.

Filtering section 403 computes an inverted phase filter coefficient, which is obtained by reversing, in the front-back direction, the position of each pixel value in the unit partial target image for subpixel estimation extracted by image extraction section 402. Using the thus computed inverted phase filter coefficient, filtering section 403 then performs a filtering process on the unit partial reference image for subpixel estimation. Filter generation section 403 then outputs the results of the filtering process (hereinafter referred to as "filtering results") to peak position detection section 104.

With respect to the filtering results received from filter section 103, peak position detection section 104 acquires the relative positional relationship that provides the highest level of correlation between the unit partial target image for subpixel estimation and the unit partial reference image for subpixel estimation. Peak position detection section 104 then computes, based on the acquired relative positional relationship, the parallax (disparity) between the unit partial target image for subpixel estimation and the subpixel-level corresponding point in the unit partial reference image for subpixel estimation with respect to the target point.

High-accuracy filter section 105 takes, as input, the target point and disparity n from image matching section 102, and the stereo images from stereo image acquisition section 101, as well as the subpixel-level disparity from peak position detection section 104.

Like filter section 103, high-accuracy filter section 105 computes an inverted phase filter coefficient based on the unit partial target image for subpixel estimation, and performs filtering on the unit partial reference image for subpixel estimation using the thus computed inverted phase filter coefficient. In other words, like filter section 103, high-accuracy filter section 105 first extracts the unit partial target image for subpixel estimation from the target image, and computes the inverted phase filter coefficient based on the unit partial target image for subpixel estimation. In other words, the inverted phase filter coefficient is computed based on the unit partial target image for subpixel estimation extracted from the target image.

However, unlike filter section 103, high-accuracy filter section 105 next shifts, by an amount corresponding to the subpixel-level disparity received from peak position detection section 104, the window function for subpixel-level estimation that was used to extract the unit partial reference image for subpixel estimation at filter section 103, and thereby forms a shifted window function for subpixel-level estimation to be used in extracting the unit partial reference image for subpixel estimation at high-accuracy filter section 105. Using the shifted window function for subpixel-level estimation, high-accuracy filter section 105 then extracts the unit partial reference image for subpixel estimation from the reference image. Using the computed inverted phase filter coefficient, high-accuracy filter section 105 performs a filtering process on the unit partial reference image for subpixel estimation, and outputs the filtering results to peak position detection section 106.

Figure 3:
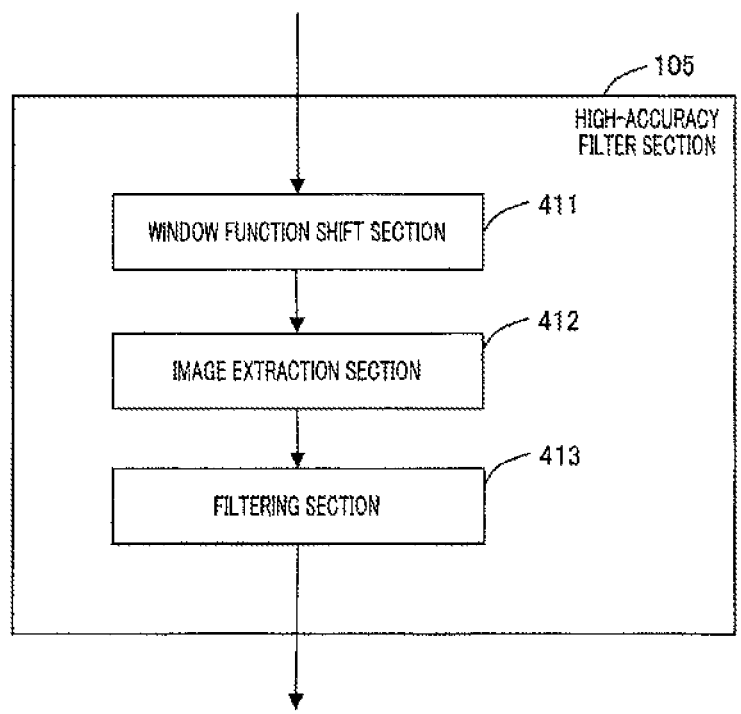
FIG. 3 is a block diagram showing the configuration of a high-accuracy filter section.

FIG. 3 shows a configuration of high-accuracy filter section 105. With respect to FIG. 3, high-accuracy filter section 105 includes window function shift section 411, image extraction section 412, and filtering section 413.

By shifting, by an amount corresponding to the subpixel-level disparity computed at peak position detection section 104, the window function for subpixel-level estimation used in extracting the unit partial reference image for subpixel estimation at filter section 103, window function shift section 411 forms the shifted window function for subpixel-level estimation to be used in extracting the unit partial reference image for subpixel estimation at high-accuracy filter section 105.

Image extraction section 412 extracts from the target image the unit partial target image for subpixel estimation including the target point. Furthermore, using the shifted window function for subpixel-level estimation formed at window function shift section 411, image extraction section 412 extracts from the reference image the unit partial reference image for subpixel estimation including the corresponding point (i.e., a point in the reference image that is displaced by disparity n from the same coordinates as the target point). In other words, image extraction section 412 has generally the same functionality as image extraction section 402.

Filtering section 413 computes an inverted phase filter coefficient based on the unit partial target image for subpixel estimation extracted at image extraction section 412. Using the computed inverted phase filter coefficient, filtering section 413 then performs a filtering process on the unit partial reference image for subpixel estimation, and outputs the filtering results to peak position detection section 106. In other words, filter section 413 has generally the same functionality as filtering section 403.

Referring back to FIG. 1, peak position detection section 106 computes the subpixel-level disparity between the target image and the reference image by detecting the position of the peak in the filtering results received front high-accuracy filter section 105. The term "peak" as used above refers to the position at which the filtering results exhibit the greatest value.

[Operations of Stereo Image Processing Apparatus 100]

Operations of stereo image processing apparatus 100 configured thus are described below.

In the descriptions below, it is assumed that the X-axis lies in the horizontal direction of the image, that the Y-axis lies in the vertical direction of the image, and that one pixel represents one coordinate point. For purposes of convenience, it is also assumed that the direction of epipolar lines (the base line length direction) is parallel to the X-axis across the entirety of the images.

Figure 4:
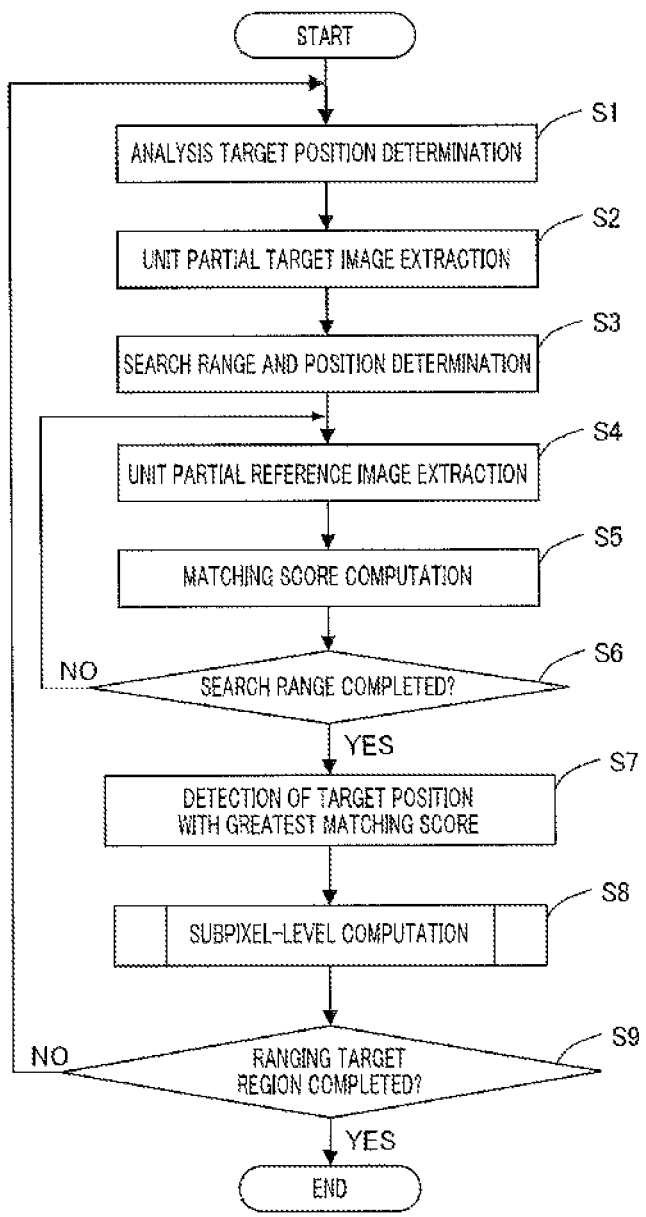
FIG. 4 is a flow chart illustrating operations of a stereo image processing apparatus.

FIG. 4 is a flow chart illustrating operations of stereo image processing apparatus 100. Although what follows is a description of a process with regard to a given target point in the target image, stereo image processing apparatus 100 performs the operations of steps S1 through S9 below with respect to all pixels within a ranging target region by sequentially moving the target point across the entire target image.

<Analysis Target Position Determination Process>

In step S1, image matching section 102 determines the position of a target point (hereinafter referred to as an "analysis target position") which is to serve as a target for analysis in a ranging target region.

<Unit Partial Target Image Extraction Process>

In step S2, image matching section 102 extracts a unit partial target image from the target image received from stereo image acquisition section 101. The unit partial target image is a partial region image (an image region) based on the analysis target position. (i.e., the target point) determined in step S1. The size of the unit partial target image is expressed in pixels. In other words, the unit partial target image is an image made up of a plurality of pixel rows and a plurality of pixel columns.

<Search Range and Search Start Position Determination Process>

In step S3, image matching section 102 determines a search range and a search start position with respect to the reference image based on the analysis target position determined in step S1. The parallax of the stereo images is determined by the base line length, which is the distance between the cameras, the focal length of the lenses, and the distance from the stereo camera to the object of interest. Accordingly, image matching section 102 may determine the search range based on the distance from the stereo camera to the object to be ranged. Furthermore, since an object that is at infinity from the stereo camera is imaged at the same position in the target image and the reference image, image matching section 102 may set the same coordinates as the target point in the target image to be the search start position in the reference image.

<Unit Partial Reference Image Extraction Process>

In step S4, image matching section 102 determines an extraction target position, and extracts from the reference image a unit partial reference image of the same size as the unit partial target image. Image matching section 102 may take the search start position determined in step S3 to be the initial extraction target position, for example, and subsequently move the extraction target position.

<Matching Score Computation Process>

In step S5, image matching section 102 computes the level of match between the unit partial target image and the unit partial reference images. For this level of match, an SAD value, which is a measure of intensity difference, or intensity similarity may be used, for example.

<Search Range Completion Determination Process>

In step S6, image matching section 102 performs a completion determination process regarding the processing of the search range. In other words, image matching section 102 determines whether or not the search range has been covered by moving the extraction target position. If it is determined that the search range has not been completed (step S6: No), image matching section 102 returns to step S4. As a result, image matching section 102 moves the extraction target position within the search range so as to displace the extraction region for the unit partial reference image in step S4. Thus, the processes of steps S4 through S6 are repeated until the search range is completed (step S6: Yes).

<Matching Score Maximum Position>

In step S7, based on the plurality of matching scores obtained through the processes of steps S4 through S6, image matching section 102 determines the position of the unit partial reference image at which the matching score becomes greatest. If intensity difference is used for the matching score, image matching section 102 detects the unit partial reference image that results in an extremely small, or the smallest, intensity difference.

The processes of steps S2 through S7 will now be described in detail with reference to FIG. 5.

Figure 5:
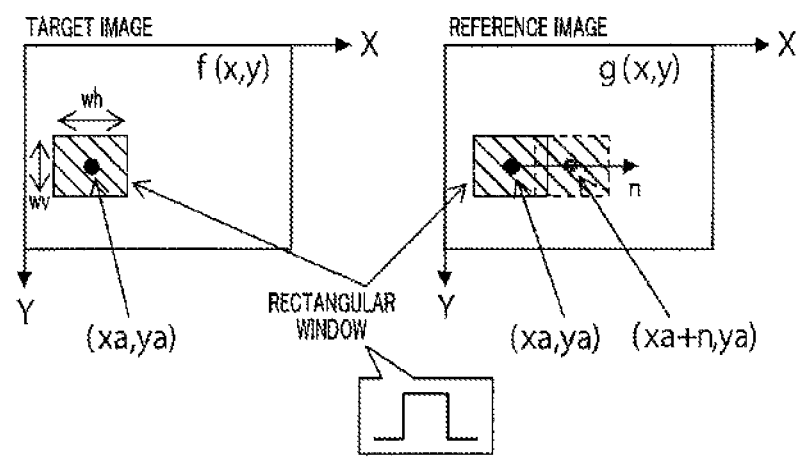
FIG. 5 is a diagram illustrating a process by an image matching section.

As shown in FIG. 5, in step S2 mentioned above, image matching section 102 extracts as a unit partial target image a partial image of the surroundings centered around analysis target position (target point) (xa, ya). For this extraction of a unit partial target image, a rectangular window of a predetermined size (vertical size: wv pixels, horizontal size: wh pixels) defined by a window function for pixel-level estimation is used. Furthermore, although it is assumed in the description below that the center of the rectangular window defined by the window function for pixel-level estimation is aligned with the analysis target position, it need not be strictly at the center, and the analysis target position need only be located near the center of the rectangular window.

Next, in step S3 mentioned above, image matching section 102 determines a search range and a search start position in the reference image based on the analysis target position determined in step S1. For the search start position (the initial coordinates for extracting a unit partial reference image from the reference image), the same coordinates (xa, ya) as the analysis target position in the target image may be used, for example. Next, as shown in FIG. 5, image matching section 102 extracts, from the reference image and as unit partial reference images, partial images surrounding the search start position at the center in step S4 while sequentially shifting the extraction target position. For the case at hand, the extraction target position is shifted by one pixel at a time. For this extraction of unit partial reference images, the same rectangular window as the rectangular window used for the extraction of the unit partial target image is used. In other words, for the extraction of the unit partial target image and the unit partial reference images, rectangular windows defined by the same window function for pixel-level estimation are used.

In step S5 mentioned above, image matching section 102 then computes the level of match between the unit partial target image and each unit partial reference image. For this level of match, an SAD value, which is a measure of intensity difference, may be used, for example. This SAD value is computed through equation 1 below.

(Equation 1)

$$SAD(n) = \sum_{j=ya-wv/2}^{ya+wv/2} \sum_{i=xa-wh/2}^{xa+wh/2} |f(x+i, y+j) - g(x+i+n, y+j)| \quad [1]$$

Then, as shown in FIG. 5, if, in step S6 mentioned above it is determined that the search range has not been completed, image matching section 102 shifts the extraction position, returns to step S4, and extracts a new unit partial reference image from the reference image. For the case at hand, the extraction position is shifted by one pixel at a time. Furthermore, the direction of the shift is the direction indicated by the right arrow extending from coordinates (xa, ya) in the reference image in FIG. 5.

Image matching section 102 thus computes, with respect to a single unit partial target image, the respective SAD values of a plurality of unit partial reference images. In step S7, based on the plurality of matching scores obtained through the process of step S5, image matching section 102 then identifies the unit partial reference image that has the greatest matching score. Specifically, image matching section 102 identifies the unit partial reference image corresponding to the smallest SAD value among the plurality of SAD values, for example. Assuming that the coordinates of the extraction target position for the thus identified unit partial reference image is (xa+n, ya), then n is the disparity in pixels. Image matching section 102 then takes the extraction target position at which the SAD value is smallest to be the pixel-level corresponding point for the analysis target position (target point). Although SAD values have been used above as measures of matching score, the claimed invention is by no means limited as such, and anything that may be used as a measure of matching score may be employed instead. By way of example, image matching section 102 may also use the sum of squared differences (SSD) as a measure of matching score.

The above concludes this detailed description of the processes of steps S2 through S7.

<Subpixel-Level Computation Process>

In step S8 in FIG. 4, filter section 103 and peak position detection section 104 perform a subpixel-level computation process based on the pixel-level corresponding point obtained in step S7 and on the target image and reference image received from stereo image acquisition section 101.

Figure 6:
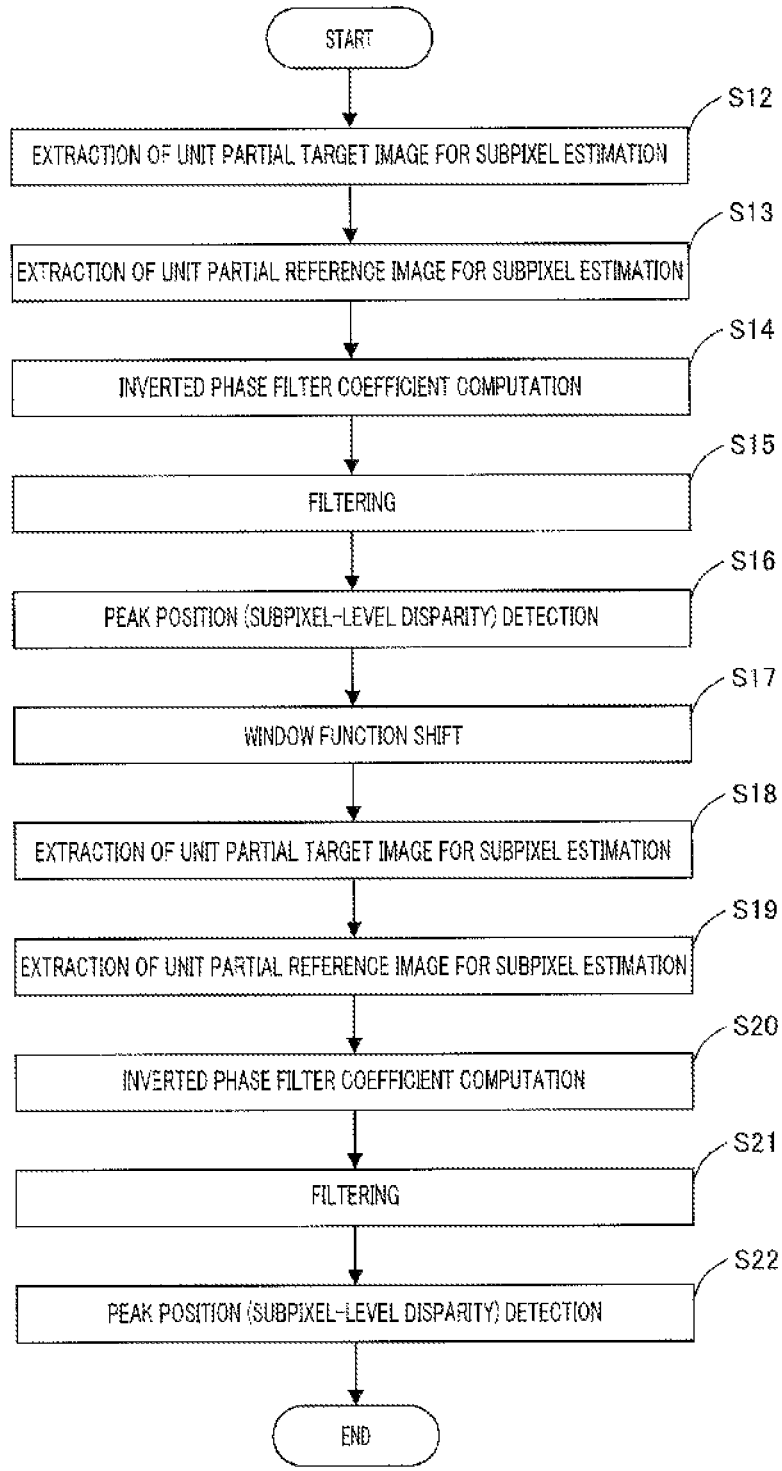
FIG. 6 is a flow chart showing the details of a subpixel-level computation process.
Figure 7:
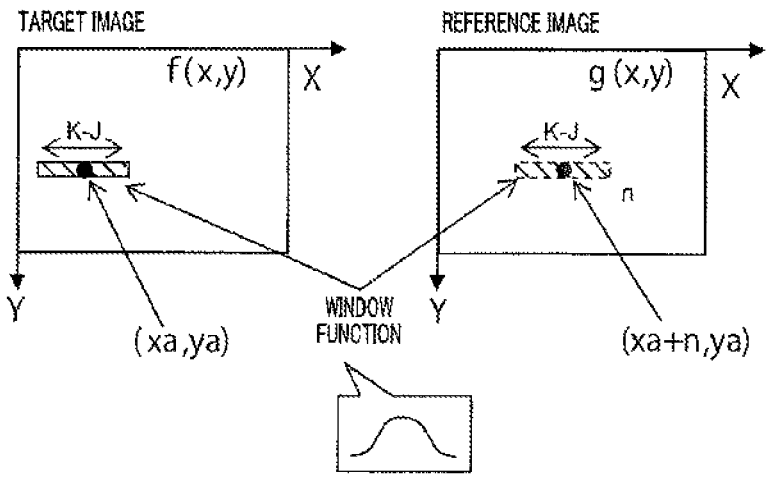
FIG. 7 is a diagram illustrating the concept of a subpixel-level computation process.
Figure 7:
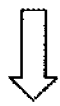

FIG. 6 is a flow chart showing the details of a subpixel-level computation process. FIG. 7 is a diagram illustrating the concept of a subpixel-level computation process.

(Extraction Process for Unit Partial Target Image for Subpixel Estimation)

In step S12, image extraction section 402 extracts from the unit partial target image a unit partial target image for subpixel estimation. The size of the unit partial target image for subpixel estimation is given in pixels. The extraction position for the unit partial target image for subpixel estimation is assumed to be from the position of the target point, and its direction is assumed to he the X-axis direction, which is parallel to an epipolar line.

Furthermore, for the extraction of the unit partial target image for subpixel estimation, a window function for subpixel-level estimation is used. As the window function for subpixel-level estimation, window function w(m) of the Hanning window represented by equation 2 may be used, for example.

(Equation 2)

$$w(m) = \frac{1}{2}\left\{\cos\left(\pi \frac{m}{K-J}\right) + 1\right\} \quad [2]$$

Although the description below involves a case where a Hanning window function is used as the window function for subpixel-level estimation, the claimed invention is by no means limited as such, and it is also possible to use the Hamming window, the Blackman window, the Kaiser window, and/or the like, for the window function. A choice is made from among these window functions in accordance with which property of the unit partial target image for subpixel estimation is to be prioritized (e.g., spectral power property, phase property, extraction edge continuity). By way of example, if the phase property is to be prioritized, the Kaiser window would be suitable. However, using the Kaiser window results in very complex computations. On the other hand, from the perspective of reducing computations, the Hanning window is favorable.

In the image extraction process for estimating parallax on a subpixel level, it is important that the extracted image be free of noise. This is to ensure that disparity is derived accurately on a subpixel level. On the other hand, since the image extraction process at image matching section 102 is performed on a pixel level, reducing the number of computations is given greater importance than is accuracy. Accordingly, for the window function for pixel-level estimation used at image matching section 102, a window function for merely extracting image data is used. By contrast, since noise being low holds greater importance for the window function for subpixel-level estimation used in the extraction process for the unit partial target image for subpixel estimation, it is preferable that it be a function where, as compared to the window function for pixel-level estimation, changes at both ends of the window are continuous (i.e., a function where the values at the beginning and end of one period are zero).

By using such a window function for subpixel-level estimation, continuity is ensured for the signal of the unit partial target image for subpixel estimation, and noise components caused by extraction, which are included in the properties of the later-described inverted phase filter, may be reduced. Comparing the window function for pixel-level estimation and the window function for subpixel-level estimation with regard to their frequency properties, the window function for pixel-level estimation has a main-lobe of a narrower width and a side-lobe of a greater amplitude as compared to the window function for subpixel-level estimation.

In FIG. 7, for window function w(m) for subpixel-level estimation, a Hanning window so sized that the vertical axis is one pixel and the horizontal axis is "K-J" pixels is used. m is an integer equal to or greater than J but equal to or less than K. Window function w(m) for subpixel-level estimation is set with target point (xa, ya) at the center. Thus, an image whose vertical axis size is one pixel and whose horizontal axis size is "K-J" pixels is extracted, as the unit partial target image for subpixel estimation, with target point (xa, ya) at the center. f'(m) represents the intensity value of the unit partial target image for subpixel estimation.

(Extraction Process for Unit Partial Reference Image for Subpixel Estimation)

In step S13, image extraction section 402 extracts a unit partial reference image for subpixel estimation from the unit partial reference image detected in step S7 which has the greatest level of match with respect to the unit partial target image. The same window function for subpixel-level estimation as that for the unit partial target image for subpixel estimation is also used in the extraction process for the unit partial reference image for subpixel estimation. However, the window function for subpixel-level estimation is set at corresponding point (xa+n, ya). Thus, an image whose vertical axis size is one pixel and whose horizontal axis size is "K-J" pixels is extracted, as a unit partial reference image for subpixel estimation, with corresponding point (xa+n, ya) at the center. In FIG. 7, g'(m) represents the intensity value of the unit partial reference image for subpixel estimation.

In the description above, window function w(m) for subpixel-level estimation so sized that the vertical axis is one pixel and the horizontal axis is "K-J" pixels is used. However, this size is merely an example, and is by no means limiting. By way of example, if the vertical size is taken to be three pixels, the process described above may be performed one pixel at a time, and the results thus obtained may be averaged. Furthermore, by way of example, if the vertical size spans a plurality of pixels, the process described above may be performed one vertical pixel at a time, and the results per pixel included in the vertical size may be weighted and averaged. The weighting coefficients to be used in this case may be determined by a window function as in two-dimensional POC. If the vertical size of the unit partial target image for subpixel estimation and the unit partial reference image for subpixel estimation is two pixels or greater, image extraction section 402 performs an averaging process such as that above, and converts each of the unit partial target image for subpixel estimation and the unit partial reference image for subpixel estimation into a one-dimensional data sequence.

(Inverted Phase Filter Coefficient Computation Process)

In step S14, filtering section 403 computes an inverted phase filter coefficient based on the unit partial target image for subpixel estimation. Specifically, filter section 103 rearranges the data sequence in reverse order by inverting the positions of the pixels in the constituent data sequence of the unit partial target image for subpixel estimation.

(Filtering Process)

In step S15, filtering section 403 performs filtering on the unit partial reference image for subpixel estimation using the inverted phase filter coefficient computed in step S14, and outputs the filtering results to peak position detection section 104.

When determining parallax with respect to an object of the same size in a real space, if the object is located far from the stereo camera, parallax would be less as compared to when it is located closer, and pixel-level disparity n would also be smaller. At the same time, the image region size for the object in the base line length direction would also be smaller.

Accordingly, it is preferable that the tap length of the inverted phase filter be set in accordance with the size of pixel-level disparity n detected at image matching section 102. By way of example, if pixel-level disparity n is small, the tap length of the inverted phase filter is set short accordingly. By adaptively varying the size of the unit partial target image for subpixel estimation and the unit partial reference image for subpixel estimation with respect to disparity n, stereo image processing apparatus 100 is able to adaptively vary the tap length of the inverted phase filter as well. Parallax computation commensurate with the size of the object of interest thus becomes possible.

The filtering results are output of a linear shift invariant system. Accordingly, once lens distortion correction errors, errors such as gain noise and/or the like stemming from image sensors (e.g., CCDs), and errors in image extraction computation accuracy resulting from the application of windows are eliminated the filtering results should theoretically represent the true disparity. Thus, by interpolating values between the pixels in accordance with the sampling theorem with regard to the output of the inverted phase filter discretized on a pixel level, it is possible to derive the true peak position on a subpixel level.

(Peak Position (Subpixel-Level Disparity) Detection)

In step S16, peak position detection section 104 detects peak positions based on the filtering results, and computes the subpixel-level disparity (i.e., the displacement of the peak positions in the X-axis direction) between the target image and the reference image. Peak position detection section 104 then outputs the computation result to high-accuracy filter section 105.

(Window Function Shift)

In step S17 window function shift section 411 forms a shifted window function for subpixel-level estimation by shifting the window function for subpixel-level estimation used for the extraction of the unit partial reference image for subpixel estimation at filter section 103 by an amount corresponding to the subpixel-level disparity between the target image and the reference image computed at peak position detection section 104. The shifted window function for subpixel-level estimation is used at image extraction section 412 to extract the unit partial reference image for subpixel estimation. Window function shift section 411 outputs the shifted window function for subpixel-level estimation to image extraction section 412. Thus, the shifted window function for subpixel-level estimation set in image extraction section 412.

(Extraction Process for Unit Partial Target Image for Subpixel Estimation)

In step S18, image extraction section 412 extracts the unit partial target image for subpixel estimation from the unit partial target image using the window function for subpixel-level estimation. The extraction process in step S18 is similar to the process in step S12.

(Extraction Process for Unit Partial Reference Image for Subpixel Estimation)

In step S19, using the shifted window function for subpixel-level estimation, image extraction section 412 extracts a unit partial reference image for subpixel estimation which is based on the position of the unit partial reference image whose level of match identified in step S7 is the greatest. The extraction process in step S19 is generally the same as the process in step S13, but uses a different window function to extract the unit partial reference image for subpixel estimation. Specifically, the window functions used in these two steps (i.e., the window function for subpixel-level estimation and the shifted window function for subpixel-level estimation) are offset by a gap corresponding to the disparity detected in step S16.

(Inverted Phase Filter Coefficient Computation Process)

In step S20, filtering section 413 computes an inverted phase filter coefficient based on the unit partial target image for subpixel estimation. The computation process in step S20 is the same as the process in step S14.

(Filtering Process)

In step S21, filtering section 413 performs filtering on the unit partial reference image for subpixel estimation using the inverted phase filter coefficient computed in step S20, and outputs the filtering results to peak position detection section 106.

(Peak Position (Subpixel-Level Disparity) Detection)

In step S22, peak position detection section 106 detects peak positions based on the filtering results, and computes the subpixel-level disparity (i.e., the displacement of the peak positions in the X-axis direction) between the target image and the reference image.

The concept of a process at high-accuracy filter section 105 will now be described.

Figure 8:
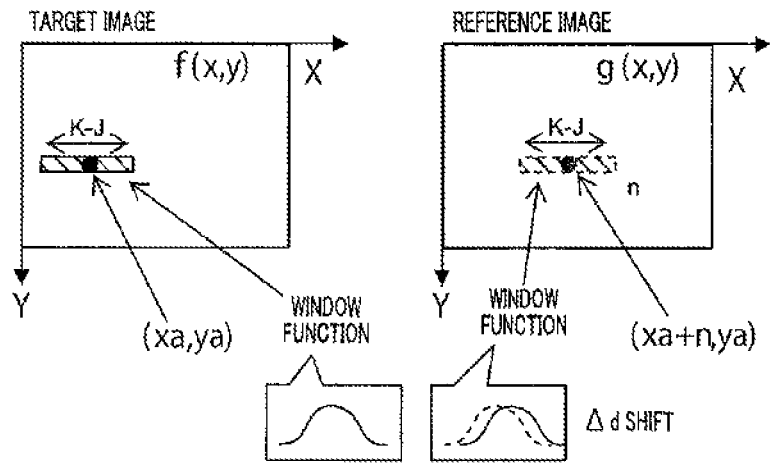
FIG. 8 is a diagram illustrating the concept of a subpixel-level computation process.
Figure 8:

FIG. 8 is a diagram illustrating the concept of a process at a high-accuracy filter section. With respect to FIG. 8, as window function w(m) for subpixel-level estimation for the target image, a Hanning window that is so sized that the vertical axis is one pixel and the horizontal axis is "K-J" pixels is used. m is an integer equal to or greater than J but equal to or less than K. Window function w(m) for subpixel-level estimation is set with target point (xa, ya) at the center. Thus, an image whose vertical axis size is one pixel and whose horizontal axis size is "K-J" pixels is extracted, as the unit partial target image for subpixel estimation, with target point (xa, ya) at the center. f'(m) represents the intensity value of the unit partial target image for subpixel estimation.

On the other hand, as shifted window function w(m) for subpixel-level estimation for the reference image, a Hanning window which is so sized that the vertical axis is one pixel and the horizontal axis is "K-J" pixels, and which is obtained by shifting window function w(m) for subpixel-level estimation by an amount corresponding to the subpixel-level disparity computed at peak position detection section 104 is used. Shifted window function w(m) for subpixel-level estimation is set with corresponding point (xa+n, ya) at the center. Thus, an image whose vertical axis size is one pixel and whose horizontal axis size is "K-J" pixels is extracted, as the unit partial reference image for subpixel estimation, with corresponding point (xa+n, ya) at the center.

FIGS. 9A through 9E are charts illustrating the concept of a process by window function shift section 411. FIG. 9A shows the intensity signal of the target image across the extracted range (e.g., 15 pixels) and the intensity signal of the reference image across the extracted range. In other words, FIG. 9A plots the intensity value at each pixel with respect to 15-pixels'-worth of both the target image and the reference image. FIG. 9B shows a widow function for subpixel-level estimation for extracting the unit partial target image for subpixel estimation and the unit partial reference image for subpixel estimation at filter section 103.

FIG. 9C shows the results of applying the window function for subpixel-level estimation shown in FIG. 9B to the target image and reference image shown in FIG. 9A. Specifically, FIG. 9C shows intensity signals wherein the effects of discontinuity at their end points have been reduced through the application of the window function for subpixel-level estimation. FIG. 9D shows, with respect to high-accuracy filter section 105, a window function for subpixel-level estimation for extracting the target image for subpixel estimation and a shifted window function for subpixel-level estimation for extracting the reference image for subpixel estimation. In this case, the disparity between the window function for subpixel-level estimation and the shifted window function for subpixel-level estimation (i.e., the shift amount imparted to the shifted window function for subpixel-level estimation) corresponds to the phase difference between, with respect to FIG. 9C, the results of applying the window function for subpixel-level estimation to the target image (the target image for subpixel estimation outputted by image extraction section 402) and the results of applying the window function for subpixel-level estimation to the reference image (the reference image for subpixel estimation outputted by image extraction section 402).

FIG. 9E shows the results of applying the window function for subpixel-level estimation and the shifted window function for subpixel-level estimation to the target image and the reference image, respectively, shown in FIG. 9A (the target image for subpixel estimation outputted by image extraction section 402 and the target image for subpixel estimation outputted by image extraction section 412).

Figure 10:
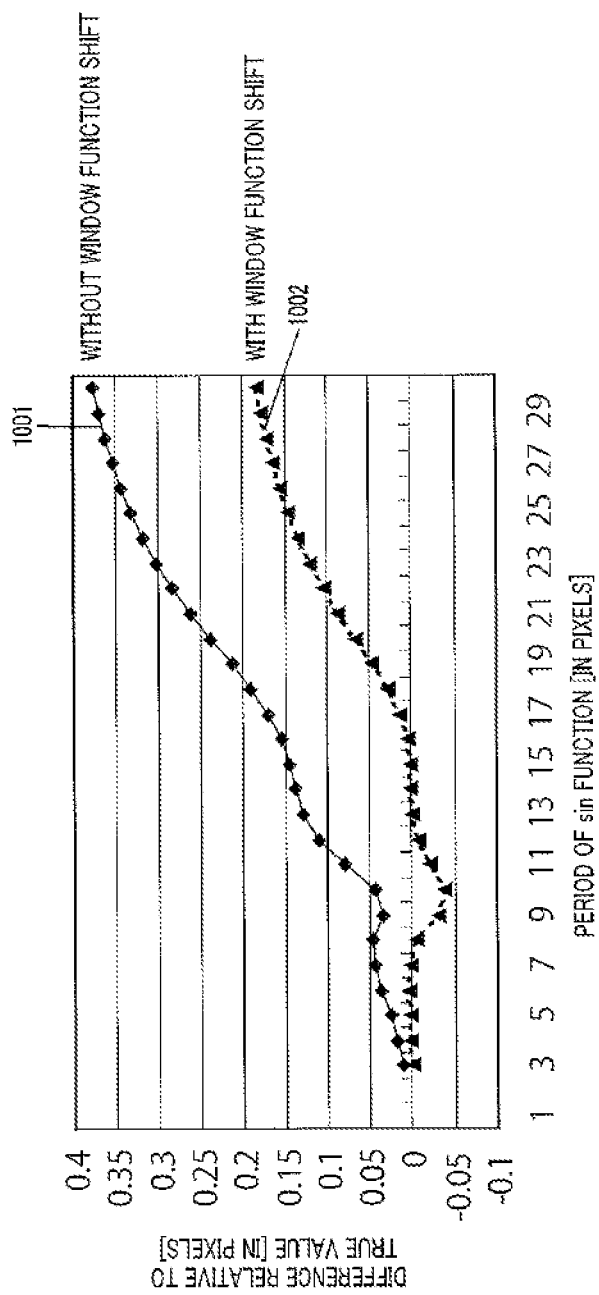
FIG. 10 is a chart illustrating the concept of a process by a window shift section.

FIG. 10 is a chart illustrating an effect of a process by window function shift section 411. With respect to FIG. 10, the horizontal axis represents the period of the sin function used as a window function, and the vertical axis represents differences between true values of parallax and computed subpixel-level disparities between the target image and the reference image.

Curve 1001 formed by the "♦" marks plotted in FIG. 10 shows the results of peak position detection performed based on the pixel data sequence shown in FIG. 9C of the unit partial target image for subpixel estimation extracted from the target image by applying the window function for subpixel-level estimation, and the pixel data sequence of the unit partial reference image for subpixel estimation extracted from the reference image by applying the window function for subpixel-level estimation.

On the other hand, curve 1002 formed by the "▲" marks plotted in FIG. 10 shows the results of peak position detection. performed based on the pixel data sequence shown in FIG. 9E of the unit partial target image for subpixel estimation extracted from the target image by applying the window function for subpixel-level estimation, and the pixel data sequence of the unit partial reference image for subpixel estimation extracted from the reference image by applying the shifted window function for subpixel-level estimation.

As can be seen from curve 1001 and curve 1002 in FIG. 10, when the window function for subpixel-level estimation is not shifted, the differences (errors) between the computed subpixel-level disparities and the true values are greater, whereas when the window function for subpixel-level estimation is shifted, the differences (errors) between the computed subpixel-level disparities and the true values are generally close to 0. In other words, by shifting the window function for subpixel-level estimation, it is possible to improve the accuracy of the computed subpixel-level disparity.

The reason that there thus are differences in the errors relative to the true values between cases where the window function for subpixel-level estimation is not shifted and cases where the window function for subpixel-level estimation is shifted is as follows.

The target image and reference image as shown in FIG. 9A are image data sequences that are referenced based on "disparity n" computed at image matching section 102. Between "disparity n" computed at image matching section 102 and the true values, there exist a maximum error of 0.5 pixels and a minimum error of 0 pixels. If the same window function for subpixel-level estimation such as that shown in FIG. 9B is used on both the target image and the reference image (i.e., if the shift interval between the window function used for the target image and the window function used for the reference image is zero) when the error is greatest (i.e., when the error is 0.5 pixels), a subpixel-level disparity would be computed in such a manner that it is more greatly affected by the fact the phase difference between the window functions that are used for the target image and the reference image is 0 pixels than it is by the 0.5-pixel difference relative to the true value. Consequently, as shown in FIG. 10, there occurs a difference (error) between the computed subpixel-level disparity and the true value.

On the other hand, when a pair including a window function for subpixel-level estimation and a shifted window function for subpixel-level estimation, to which is imparted a shift interval corresponding to the error between "disparity n" and the true value, is used (see FIG. 9D), it is possible to perform image extraction in accordance with the error between "disparity n" and the true value. A subpixel-level disparity computed using image data thus extracted is closer to the true value, thereby enabling a drastic reduction in the difference (error) relative to the true value as shown in FIG. 10.

The improvement in parallax computation accuracy brought about by shifting the window function for subpixel-level estimation increases as the error between pixel-level "disparity n" and the true value becomes greater. The error between pixel-level "disparity n" and the true value is dependent on the base line length of the camera (the distance between the stereo cameras), the focal length of the lenses, and the distance between the camera and the object of interest.

Window function shift section 411 may also normalize the coefficient of the shifted window function for subpixel-level estimation after shifting the window function for subpixel-level estimation. By normalizing the coefficient, the accuracy of parallax computation may be further improved. The shifted window function for subpixel-level estimation with its coefficient normalized may be represented by the following equation, for example.

(Equation 3)

$$w(m) = c \cdot \frac{1}{2}\left\{\cos\left(\pi\frac{m-\Delta d}{K-J}\right)+1\right\} \quad [3]$$

$$c = \frac{\left\{\cos\left(\pi\frac{m}{K-J}\right)+1\right\}\left\{\cos\left(\pi\frac{m}{K-J}\right)+1\right\}}{\left\{\cos\left(\pi\frac{m}{K-J}\right)+1\right\}\left\{\cos\left(\pi\frac{m-\Delta d}{K-J}\right)+1\right\}}$$

The processes in step S18 and step S20 in FIG. 6 overlap with step S12 and step S14, and may thus be omitted. In this case, the inverted phase filter obtained through step S12 and step S14 may be stored in memory (not shown), and this stored inverted phase filter may be used in step S21. Computations may thus be reduced.

<Ranging Target Region Completion Determination Process>

In step S9, a ranging target region completion determination process is performed. If there exists an unprocessed region that has not yet undergone the processes of step S1 through step S8, the processes of step S1 through step S8 are performed on that unprocessed region.

Thus, according to the present embodiment, with respect to stereo image processing apparatus 100, image extraction section 402 extracts the unit partial target image for subpixel estimation and the unit partial reference image for subpixel estimation from the target image and the reference image using the window function for subpixel-level estimation. Filtering section 403 reverses the data order of the data sequence including the intensity values of the unit partial target image for subpixel estimation extracted by image extraction section 402, thereby computing the inverted phase filter coefficient. Filtering section 403 performs filtering on the data sequence including the intensity values of the unit partial reference image for subpixel estimation using the inverted phase filter coefficient. Peak position detection section 104 computes the subpixel-level disparity based on the peak position with respect to the filtering results of the filtering section.

Based on the subpixel-level disparity computed by peak position detection section 104, window function shift section 411 shifts the window function for subpixel-level estimation, thereby forming the shifted window function for subpixel-level estimation and setting it with respect to image extraction section 412.

Image extraction section 412 extracts the unit partial target image for subpixel estimation from the target image using the window function for subpixel-level estimation, and extracts the unit partial reference image for subpixel estimation from the reference image using the shifted window function for subpixel-level estimation that has been set by window function shift section 411. Filtering section 413 computes the inverted phase filter coefficient by reversing the data order of the data sequence including the intensity values of the unit partial target image for subpixel estimation extracted by image extraction section 412, and performs filtering on the data sequence including the intensity values of the unit partial reference image for subpixel estimation using the inverted phase filter coefficient. Peak position detection section 106 computes the subpixel-level disparity based on the peak position in the filtering results of the filtering section.

It is thus possible to perform image extraction in accordance with the error between "disparity n" and the true value. The subpixel-level disparity computed using image data thus extracted is closer to the true value, consequently enabling an improvement in parallax computation accuracy.

[Embodiment 2]

In Embodiment 2, before the high-accuracy filter process, a determination is made as to whether or not to execute the high-accuracy filter process, and the high-accuracy filter process is executed in accordance with this determination result.

[Configuration of Stereo Image Processing Apparatus 900]

Figure 11:
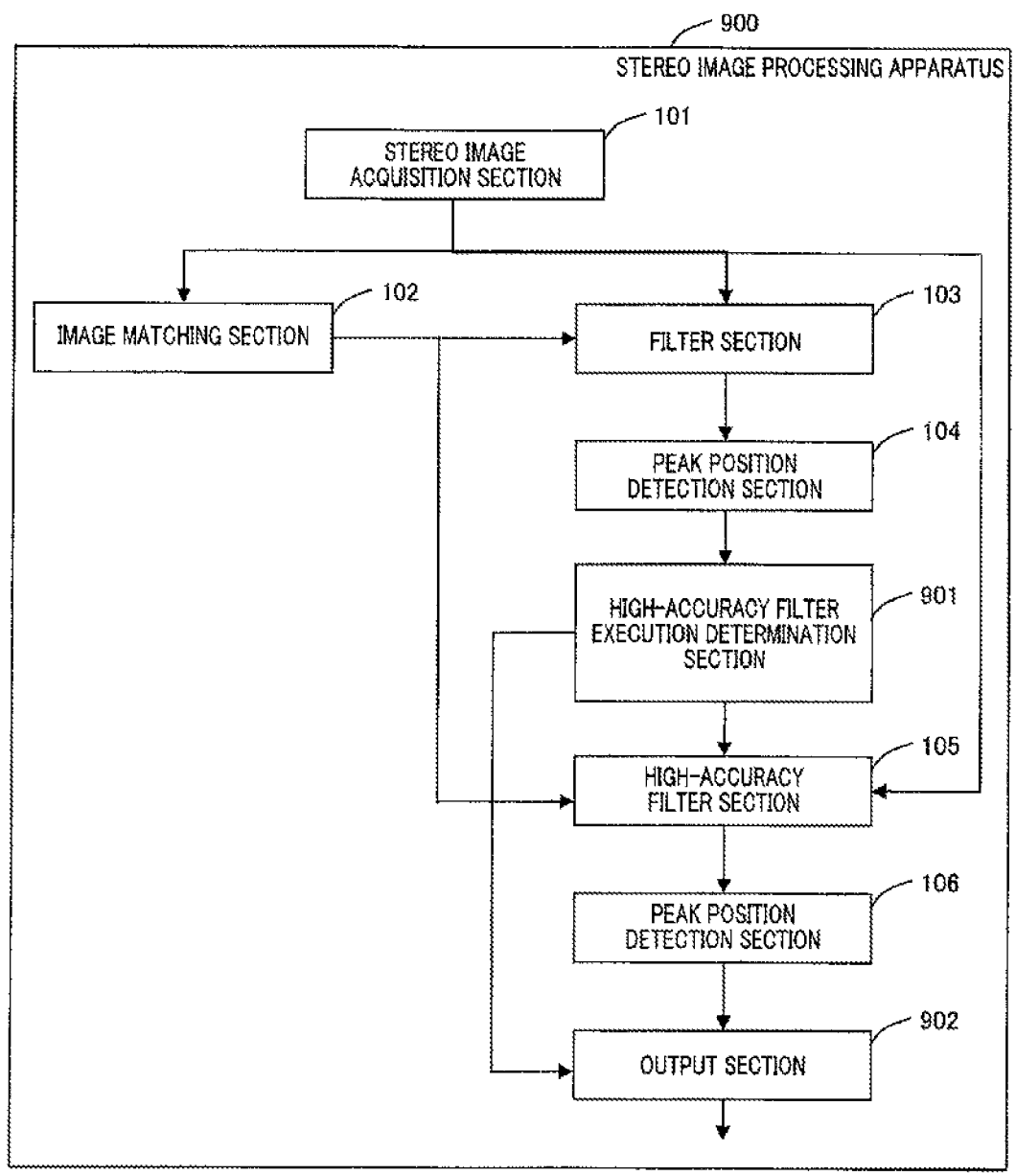
FIG. 11 is a block diagram showing the configuration of a stereo image processing apparatus according to Embodiment 2 of the claimed invention.

FIG. 11 shows a configuration of stereo image processing apparatus 900 according to Embodiment 2 of the claimed invention. With respect to FIG. 11, stereo image processing apparatus 900 includes high-accuracy filter execution determination section 901, and output section 902.

Depending on the subpixel-level disparity computed at peak position detection section 104, high-accuracy filter execution determination section 901 determines whether or not the processes of high-accuracy filter section 105 and peak position detection section 106 are to be executed. The subpixel-level disparity computed at peak position detection section 104 assumes some value from zero to a maximum value. The range from zero to a base value is taken to be a "turn-execution region," while the range from the base value to the maximum value is taken to be an "execution region." The base value may be determined during operation based on a trade-off between processing time and the required parallax accuracy. By way of example, if parallax accuracy is not a significant concern, while there is a need for a shorter processing time, the base value may be set at a relatively high value.

High-accuracy filter execution determination section 901 determines which of the "non-execution ecution region" and the "execution region" the subpixel-level disparity computed at peak position detection section 104 falls in. If it is determined that it falls in the "non-execution region," high-accuracy filter execution determination section 901 outputs to output section 902 the subpixel-level disparity outputted from peak position detection section 104. On the other hand, if it is determined that it falls in the "execution region," high-accuracy filter execution determination section 901 outputs to high-accuracy filter section 105 the subpixel-level disparity outputted from peak position detection section 104.

Output section 902 outputs the subpixel-level disparity outputted from high-accuracy filter execution determination section 901 or from peak position detection section 106.

(Operations of Stereo Image Processing Apparatus 900)

Figure 12:
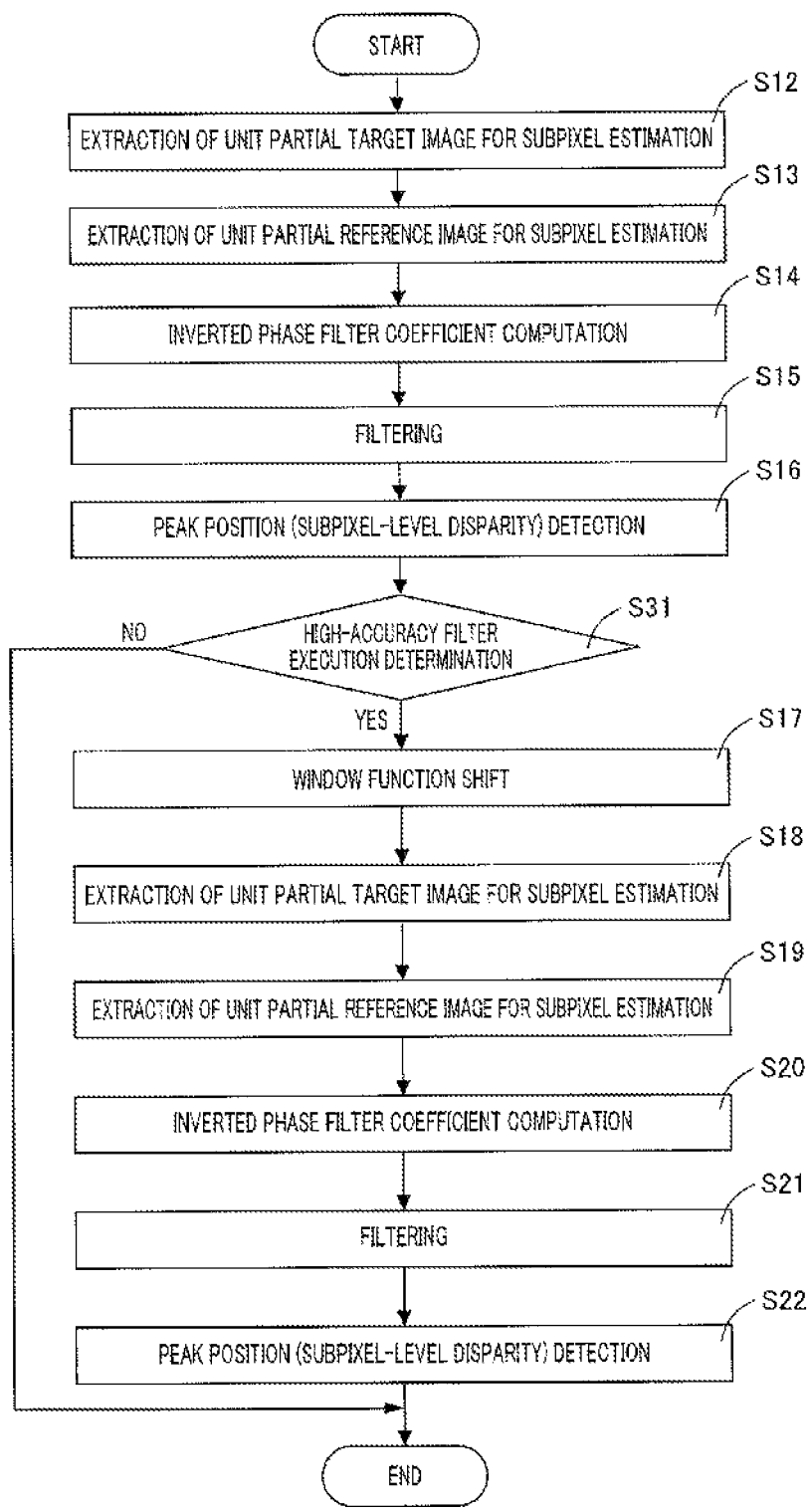
FIG. 12 is a flow chart illustrating operations of a stereo image processing apparatus.

FIG. 12 is a flow chart showing the details of a subpixel-level computation process according to Embodiment 2. In contrast to the flow chart shown in FIG. 6, the flow chart shown in FIG. 12 includes step S31 involving a high-accuracy filter execution determination.

In step S31, depending on the subpixel-level disparity computed at peak position detection section 104, high-accuracy filter execution determination section 901 determines whether or not the processes of high-accuracy filter section 105 and peak position detection section 106 are to be executed.

If it is determined that they are to be executed (step S31: Yes), the processes of step S17 through step S22 are executed.

On the other hand, if it is determined that they are not to be executed (step S31: No), the flow shown in FIG. 12 is terminated.

As mentioned above, the improvement in parallax computation accuracy brought about by shifting the window function for subpixel-level estimation increases as the error between pixel-level "disparity n" and the true value increases. Accordingly, through a determination based on the subpixel-level disparity computed at peak position detection section 104, high-accuracy filter execution determination section 901 is able to only have the processes of high-accuracy filter section 105 and peak position detection section 106 executed when the improvement in parallax computation accuracy is significant. Since it is thus possible to omit high-accuracy filter section 105 and peak position detection section 106 when the improvement in parallax computation accuracy is small, it is possible to reduce computations.

[Other Embodiments]

(1) For the various embodiments above, image extraction section 402 and image extraction section 412 have been described as distinct functional sections, as have filtering section 403 and filtering section 413, as well as peak position detection section 104 and peak position detection section 106.

However, the claimed invention is by no means limited as such, and instead, image extraction section 402 and image extraction section 412 may be provided as a single functional section, as may filtering section 403 and filtering section 413, as well as peak position detection section 104 and peak position detection section 106.

(2) For the embodiments above, the processes of steps S17, S19, S21 and S22 are not limited to being performed once, and may simply be repeated a plurality of times, or they may be repeated until the value of the subpixel-level disparity detected in step S22 falls to or below a base value. This enables a further improvement in parallax detection accuracy. In this case, in step S17 in the second and subsequent passes, a window function that is shifted by an amount corresponding to the subpixel-level disparity detected in the immediately preceding step S22 is used as the shifted window function for subpixel-level estimation.

(3) For the embodiments above, descriptions have been provided where the disparity between the target image and the reference image is detected roughly at image matching section 102 on a "pixel level," and where the disparity is subsequently detected finely at peak position detection section 104 on a "subpixel level." In other words, descriptions have been provided with regard to a case where disparity is computed in two stages. However, the claimed invention is by no means limited as such, and is also applicable to cases where disparity is computed directly on a "subpixel level" without performing the "pixel-level" detection.

(4) For the embodiments above, descriptions have been provided taking as an example a case where the claimed invention is configured with hardware. However, the claimed invention may also be realized through software in cooperation with hardware.

(5) The functional blocks used in the descriptions for the embodiments above are typically realized as LSIs, which are integrated circuits. They may be individual chips, or some or all of them may be integrated into a single chip. Although the term LSI is used above, depending on the level of integration, they may also he referred to as IC, system LSI, super LSI, or ultra LSI.

The method of circuit integration is by no means limited to LSI, and may instead be realized through dedicated circuits or general-purpose processors. Field programmable gate arrays (FPGAs), which are programmable after LSI fabrication, or reconfigurable processors, whose connections and settings of circuit cells inside the LSI are reconfigurable, may also be used.

Furthermore, should there arise a technique for circuit integration that replaces LSI due to advancements in semiconductor technology or through other derivative techniques, such a technique may naturally be employed to integrate functional blocks. Applications of biotechnology, and/or the like, are conceivable possibilities.

The disclosure of the specification, drawings, and abstract included in Japanese Patent Application No. 2010-283622, filed on Dec. 20, 2010, is incorporated herein by reference in its entirety.

Industrial Applicability

A stereo image processing apparatus and a stereo image processing method of the claimed invention are effective in that they enable accurate parallax computation even for objects of small image region sizes in the base line length direction.

REFERENCE SIGNS LIST 100, 900 Stereo image processing apparatus
101 Stereo image acquisition section
102 Image matching section
103 Filter section
104, 106 Peak position detection section
105 High-accuracy filter section.
402, 412 Image extraction section
403, 413 Filtering section
411 Window function shift section
901 High-accuracy filter execution determination section
902 Output section

The invention claimed is:

1. A stereo image processing apparatus that computes a subpixel-level disparity between a target image and a reference image that form stereo images, the stereo image processing apparatus comprising:

an extraction section that extracts a unit partial target image for subpixel estimation from the target image by applying a first window function at an extraction target position, and that extracts a unit partial reference image for subpixel estimation from the reference image by applying the first window function or a second window function that is set;

a computation section that computes the subpixel-level disparity based on a phase difference between a data sequence including intensity values of the extracted unit partial target image for subpixel estimation and a data sequence including intensity values of the extracted unit partial reference image for subpixel estimation; and a window function setting section that sets, with respect to the extraction section, the second window function, which is formed by shifting the first window function based on the subpixel-level disparity computed by the computation section, wherein the computation section further:

computes an inverted phase filter coefficient by reversing the data order of the data sequence including the intensity values of the extracted unit partial target image for subpixel estimation;

performs filtering on the data sequence including the intensity values of the unit partial reference image for subpixel estimation using the inverted phase filter coefficient; and computes the subpixel-level disparity based on a peak position in a result of the filtering.

2. The stereo image processing apparatus according to claim 1, further comprising a determination section that determines whether or not a process of the window function setting section is to be executed depending on the subpixel-level disparity computed based on the unit partial target image for subpixel estimation and unit partial reference image for subpixel estimation extracted with the first window function.

3. A stereo image processing method that computes a subpixel-level disparity between a target image and a reference image that form stereo images, the stereo image processing method comprising:

an extraction step of extracting a unit partial target image for subpixel estimation from the target image by applying a first window function at an extraction target position, and extracting a unit partial reference image for subpixel estimation from the reference image by applying the first window function or a second window function that is set;

a computation step of computing the subpixel-level disparity based on a phase difference between a data sequence including intensity values of the extracted unit partial target image for subpixel estimation and a data sequence including intensity values of the extracted unit partial reference image for subpixel estimation; and a window function setting step of forming and setting the second window function by shifting the first window function based on the subpixel-level disparity computed through the computation step, wherein the computation step further:

computes an inverted phase filter coefficient by reversing the data order of the data sequence including the intensity values of the extracted unit partial target image for subpixel estimation;

performs filtering on the data sequence including the intensity values of the unit partial reference image for subpixel estimation using the inverted phase filter coefficient; and computes the subpixel-level disparity based on a peak position in a result of the filtering.

4. The stereo image processing apparatus method to claim 3, further comprising a determination step of determining whether or not a process of the window function setting section is to be executed depending on the subpixel-level disparity computed based on the unit partial target image for subpixel estimation and unit partial reference image for subpixel estimation extracted with the first window function.

* * * * *